United States Patent
Ash et al.

(10) Patent No.: US 10,592,323 B2
(45) Date of Patent: *Mar. 17, 2020

(54) REQUESTING MANUAL INTERVENTION ON FAILURE OF INITIAL MICROCODE LOAD ATTEMPTS DURING RECOVERY OF MODIFIED CUSTOMER DATA

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/791,367

(22) Filed: Oct. 23, 2017

(65) Prior Publication Data

US 2018/0046532 A1    Feb. 15, 2018

Related U.S. Application Data

(63) Continuation of application No. 14/883,379, filed on Oct. 14, 2015, now Pat. No. 9,934,083.

(51) Int. Cl.
| | |
|---|---|
| *G06F 11/00* | (2006.01) |
| *G06F 11/07* | (2006.01) |
| *G06F 12/0815* | (2016.01) |
| *G06F 12/0868* | (2016.01) |

(52) U.S. Cl.
CPC ........ *G06F 11/0772* (2013.01); *G06F 11/073* (2013.01); *G06F 11/076* (2013.01); *G06F 11/0727* (2013.01); *G06F 11/0766* (2013.01); *G06F 12/0815* (2013.01); *G06F 12/0868* (2013.01); *G06F 2212/1032* (2013.01);
(Continued)

(58) Field of Classification Search
CPC .................................................. G06F 11/0772
USPC .......................... 714/57, 56, 1, 2, 47.2, 4.11
See application file for complete search history.

(56) References Cited

U.S. PATENT DOCUMENTS

| | | |
|---|---|---|
| 5,375,227 A | 12/1994 | Akatsu et al. |
| 5,448,719 A | 9/1995 | Schultz et al. |

(Continued)

OTHER PUBLICATIONS

Notice of Allowance dated Nov. 24, 2017, pp. 27, for U.S. Appl. No. 14/883,379, filed Oct. 14, 2015.

(Continued)

*Primary Examiner* — Matthew M Kim
(74) *Attorney, Agent, or Firm* — Rabindranath Dutta; Konrad Raynes Davda & Victor LLP

(57) ABSTRACT

A storage system maintains a cache and a non-volatile storage. An error recovery component queries a cache component to determine whether modified customer data exists in a memory preserve cache. In response to determining that the modified customer data exists in the memory preserve cache, and in response to a failure beyond a threshold number of times of initial microcode load (IML) attempts to recover the modified customer data, an error notification is transmitted for manual intervention to avoid loss of the modified customer data.

12 Claims, 10 Drawing Sheets

(52) U.S. Cl.
CPC .. *G06F 2212/202* (2013.01); *G06F 2212/281* (2013.01); *G06F 2212/313* (2013.01)

(56) References Cited

U.S. PATENT DOCUMENTS

| | | | |
|---|---|---|---|
| 5,732,238 A * | 3/1998 | Sarkozy | G06F 12/0866 711/135 |
| 5,761,705 A | 6/1998 | DeKoning et al. | |
| 6,044,444 A | 3/2000 | Ofek | |
| 6,792,511 B2 | 9/2004 | Hameed | |
| 7,100,074 B2 | 8/2006 | Watanabe et al. | |
| 7,895,465 B2 | 2/2011 | Ash et al. | |
| 7,917,378 B2 | 3/2011 | Fitzgerald et al. | |
| 7,975,169 B2 | 7/2011 | Ash et al. | |
| 9,244,788 B2 | 1/2016 | Chen et al. | |
| 9,501,545 B2 | 11/2016 | Woodward et al. | |
| 9,665,432 B2 | 5/2017 | Kruse et al. | |
| 2007/0220313 A1 | 9/2007 | Katsuragi et al. | |
| 2012/0210066 A1* | 8/2012 | Joshi | G06F 12/0866 711/118 |
| 2017/0109226 A1 | 4/2017 | Ash et al. | |

OTHER PUBLICATIONS

B. Dufrasne, et al. "IBM DS8870 Architecture and Implementation (Release 7.5)" IBM Corporation, Jul. 2015, pp. 474.

U.S. Appl. No. 14/883,379, filed Oct. 14, 2015.

Office Action dated Mar. 17, 2017, pp. 27, for U.S. Appl. No. 14/883,379, filed Oct. 14, 2015.

Response dated Jun. 19, 2017, pp. 27, to Office Action dated Mar. 17, 2017, pp. 27, for U.S. Appl. No. 14/883,379, filed Oct. 14, 2015.

Notice of Allowance dated Jul. 27, 2017, pp. 5, for U.S. Appl. No. 14/883,379, filed Oct. 14, 2015.

List of IBM Patents or Patent Applications Treated as Related, dated Oct. 23, 2017, pp. 2.

* cited by examiner

REQUESTING MANUAL INTERVENTION ON FAILURE OF INITIAL MICROCODE LOAD ATTEMPTS DURING RECOVERY OF MODIFIED CUSTOMER DATA

CROSS-REFERENCE TO RELATED APPLICATION

This application is a continuation of U.S. patent application Ser. No. 14/883,379, filed Oct. 14, 2015, which application is incorporated herein by reference in its entirety.

BACKGROUND

1. Field

Embodiments relate to the requesting of manual intervention on failure of initial microcode load attempts during recovery of modified customer data.

2. Background

A storage system may control access to storage for one or more host computational devices that may be coupled to the storage system over a network. A storage management application that executes in the storage system may manage a plurality of storage devices, such as disk drives, tape drives, flash drives, etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may have a plurality of processor cores and the servers may share the workload of the storage system. In a two server configuration of the storage system, either server can failover to the other if there is a failure or a planned downtime for one of the two servers.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data is discarded after the destage from cache to the storage drives is complete.

U.S. Pat. No. 7,975,169 entitled "Memory Preserved Cache to Prevent Data Loss" describe at least mechanisms for preserving data in a storage subsystem having a dual cache and dual non-volatile storage through a failover from a failed cluster to a surviving cluster.

U.S. Pat. No. 7,895,465 entitled "Memory Preserved Cache Failsafe Reboot Mechanism" describes at least mechanisms to preserve data in a storage subsystem having a dual cache and dual non-volatile storage through a failover from a failed cluster to a surviving cluster, where the surviving cluster undergoes a rebooting process.

SUMMARY OF THE PREFERRED EMBODIMENTS

Provided are a method, a system, a computer program product in which a storage system maintains a cache and a non-volatile storage. An error recovery component queries a cache component to determine whether modified customer data exists in a memory preserve cache. In response to determining that the modified customer data exists in the memory preserve cache, and in response to a failure beyond a threshold number of times of initial microcode load (IML) attempts to recover the modified customer data, an error notification is transmitted for manual intervention to avoid loss of the modified customer data.

In additional embodiments, the modified customer data is stored in tracks, wherein the tracks that store the modified customer data are identified in a converted direct access storage device fast write (CDFW) list.

In yet additional embodiments, the cache component requests a physical hypervisor to preserve the cache for a duration for which the tracks that store the modified customer data exist in the CDFW list, across operating system reboots.

In further embodiments, the error recovery component avoids creating a window file to fence a server in which the failure of the IML, attempts occur; and the cache component does not unpreserve the cache on failed IML attempts.

In additional embodiments, in response to determining that the modified customer data does not exist in the memory preserve cache, a window file is created by the error recovery component to fence a server that fails and IML attempt.

In certain embodiments, a rebooting of a first server or a second server of the storage system occurs during a destaging activity from the cache to a storage drive or a retrostoring activity from the cache to the non-volatile storage.

In further embodiments, writes from a host occur in parallel to the cache of a first server and the non-volatile storage of a second server.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide mechanisms to enable an error recovery (ER) component to query a cache to determine if modified customer data exists in a memory preserve cache. If modified customer data exists in the memory preserve cache, an error notification for manual intervention is sent to avoid loss of modified customer data in response to repeated failures of Initial Microcode Load (IML) attempts to recover data.

Exemplary Embodiments

Figure 1:
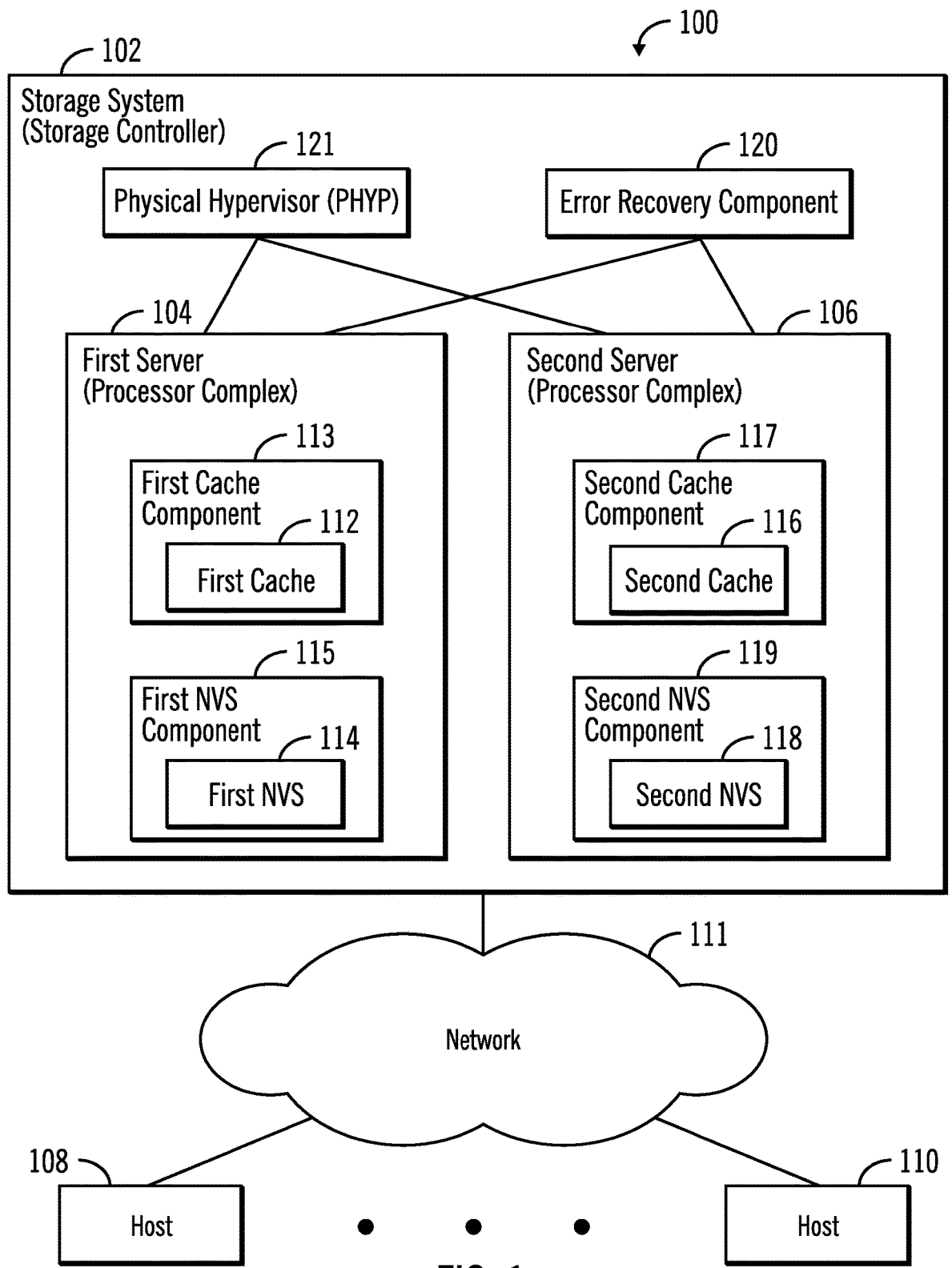
FIG. 1 illustrates a block diagram of a computing environment comprising a storage system comprising a first server and a second server, where the storage system communicates with a plurality of hosts over a network, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network 111, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex and may include one or more processors and/or processor cores.

The storage system 102, the servers 104, 106 and the hosts 108, 110 may be elements in any suitable network 111, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 112 and a first NVS 114, and the second server 106 includes memory comprising a second cache 116 and a second NVS 118. The caches 112, 116 may be part of cache components 113, 117, and the NVSs 114, 118 may be part of NVS components 115, 119. Each cache component may include a cache controller in addition to the cache and each NVS component may include a NVS controller in addition to the NVS. For the purposes of this disclosure operations shown as being performed by the cache are performed under control of the cache component, and operations shown as being performed by the NVS are performed under control of the NVS component.

The cache 112, 116 may in certain embodiments may comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory. The cache 112, 116 may store both modified and unmodified data, where the cache 112,116 may periodically destage (i.e., move) data from the cache 112, 116 to storage drives controlled by the servers 104, 106.

The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS is protected by battery backup. Normal access to the data is from the copy retained in the cache. In certain embodiments, the NVS 114, 118 may also act like a write cache.

A physical hypervisor (PHYP) 121 that is a component of system firmware of the storage system 102 provides capabilities to allow one portion of memory of a server to be used as cache and another portion be used as NVS. The PHYP 121 allows the contents of the NVS 114, 118 and cache 112, 116 to be protected in a "memory preserve cache" managed by the PHYP 121 in case of a reboot. The PHYP 121 may execute in any or all of the servers 104, 106. In certain embodiments, the PHYP 121 in may be implemented in software, firmware, hardware or any combination thereof, instead of or in addition to being implemented in the system firmware.

In certain embodiments, an error recovery component 120 that executes in the storage system 102 provides a mechanism for the requesting of manual intervention on failure of initial microcode load attempts during recovery of modified customer data. The error recovery component 120 may execute in any or all of the servers 104, 106 or may be an application that executes when virtualization is performed to access the hardware elements of the storage system 102. In certain embodiments, the error recovery component 120 may be implemented in software, firmware, hardware or any combination thereof.

It should be noted that the storage system 102 may be configured and accessed in many different ways. For example, virtualization may be performed to access the hardware elements of the storage system 102. Additionally, in certain embodiments, the storage system 102 may have a single server or more than two servers.

Figure 2:
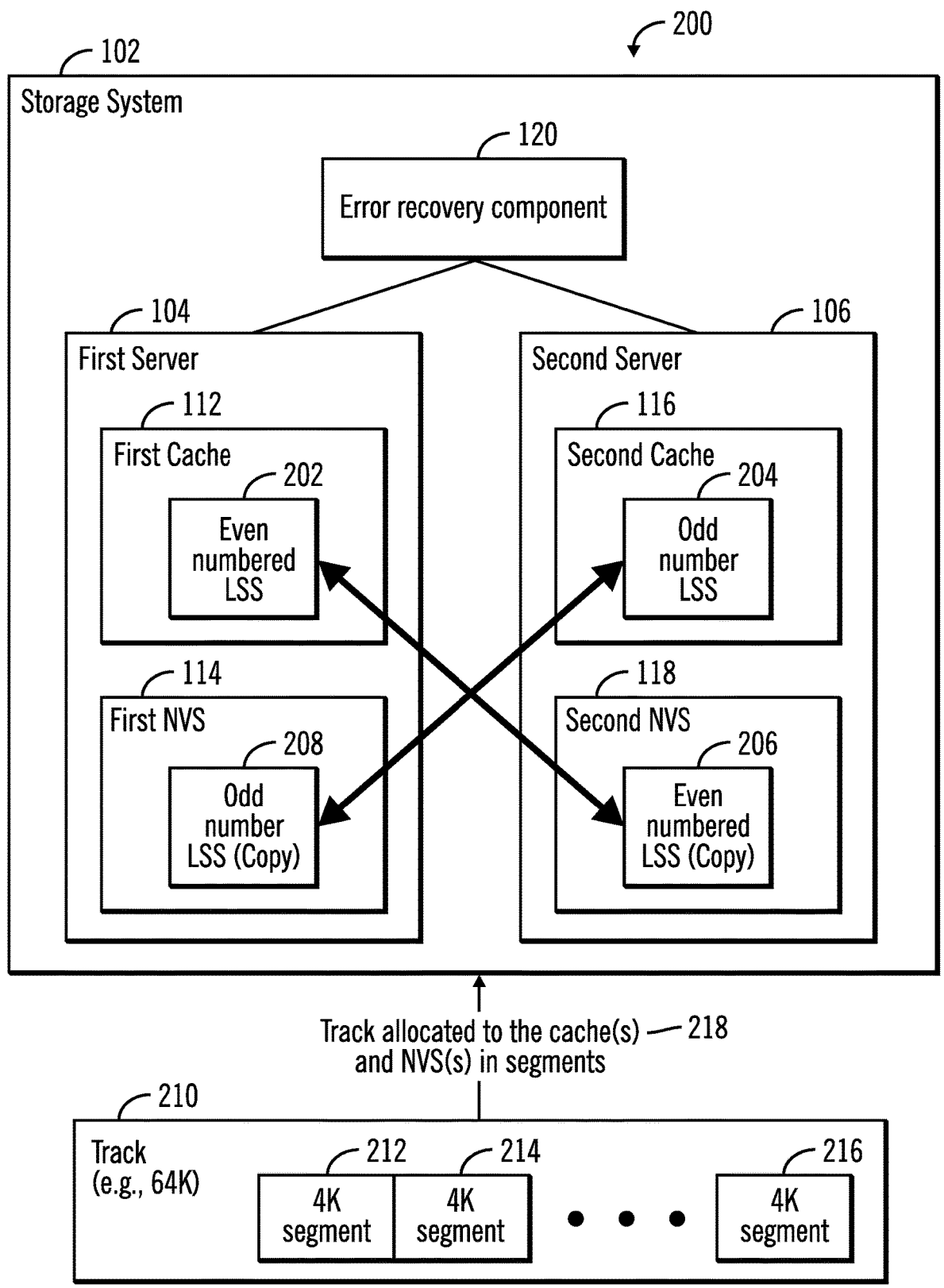
FIG. 2 illustrates a block diagram of the storage system with a first cache and a first NVS controlled by the first server, and a second cache and a second NVS controlled by the second server, in accordance with certain embodiments.

FIG. 2 illustrates a block diagram 200 of the storage system 102 with a first cache 112 and a first NVS 114 controlled by the first server 104, and a second cache 116 and a second NVS 118 controlled by the second server 106, in accordance with certain embodiments.

The first cache 112 is used for all logical volumes that are members of even numbered logical storage systems (LSS) 202. It may be noted than an LSS is a logical construct that groups logical volumes and logical units (LUN) in groups, where in certain embodiments the LSSs may be numbered via integers starting from 0 to and ending at 255 if there are 256 LSSs. Likewise, the second cache 116 is used for all logical volumes that are members of odd numbered LSSs 204. For every write that is placed into the first cache 112 of the first server 104, a copy 206 is placed into the second NVS 118 that is in the second server 106. For every write that is placed into the second cache 116 of the second server 106, a copy 208 is placed into the first NVS 114 that is in the first server 104. As a result, in case of failure of the first server 104, the second server 106 may be used for recovery of data, and in case of failure of the second server 106 the first server 104 may be used for the recovery of data.

In certain embodiments, each track (an exemplary track 210 is shown) may be 64 Kbytes in size. A track is divided into segments of sectors, which may comprise a basic unit of storage. The exemplary track 210 may be comprised of 4 Kbyte segments 212, 214, 216, where the track 210 is allocated to the cache 112, 116 and NVS 114, 118 in segments of 4 Kbytes, i.e., a subset of segments of the track 210 may be reside in the cache 112, 116 and NVS 114, 118.

In certain embodiments shown in FIG. 2, the error recovery (ER) component 120 queries a cache 112 to determine if modified customer data exists in a memory preserve cache. If modified customer data exists in the memory preserve cache, an error notification for manual intervention is sent to avoid loss of modified customer data in response to repeated failures of Initial Microcode Load (IML) attempts to recover data.

In FIG. 2, for every write that is placed into the first cache 112 of the first server 104, a copy is placed into the NVS 118 that is in the second server 106. Thus, the following normal flow of data is for a write from a host when both the first server 104 and the second server 106 are operational:
(1) Data is written to cache 112 in the first server 104. At the same time, data is written to NVS 118 of the a second server 106;
(2) The write operation is reported to the host as completed;
(3) The write data is destaged from the first cache 112 of the first server 104 to a storage drive array; and
(4) The write data is discarded from the NVS 118 of the second server 106.

Therefore, the cache has both modified and unmodified data for a track, whereas the NVS has modified data. When a track gets destaged to a disk, the track is then unmodified, and the track has then to be discarded from the NVS as the NVS only stores modified data.

Therefore a host writes to both the cache 112 and NVS 118 in parallel. A write to cache takes place in two phases. In the first phase track access is taken and the track is associated with a "write in progress". Then in a second phase the track access ends and the write completes. When a host writes a track into NVS, then after writing the track a commit is performed to indicate that write is complete.

Figure 3:
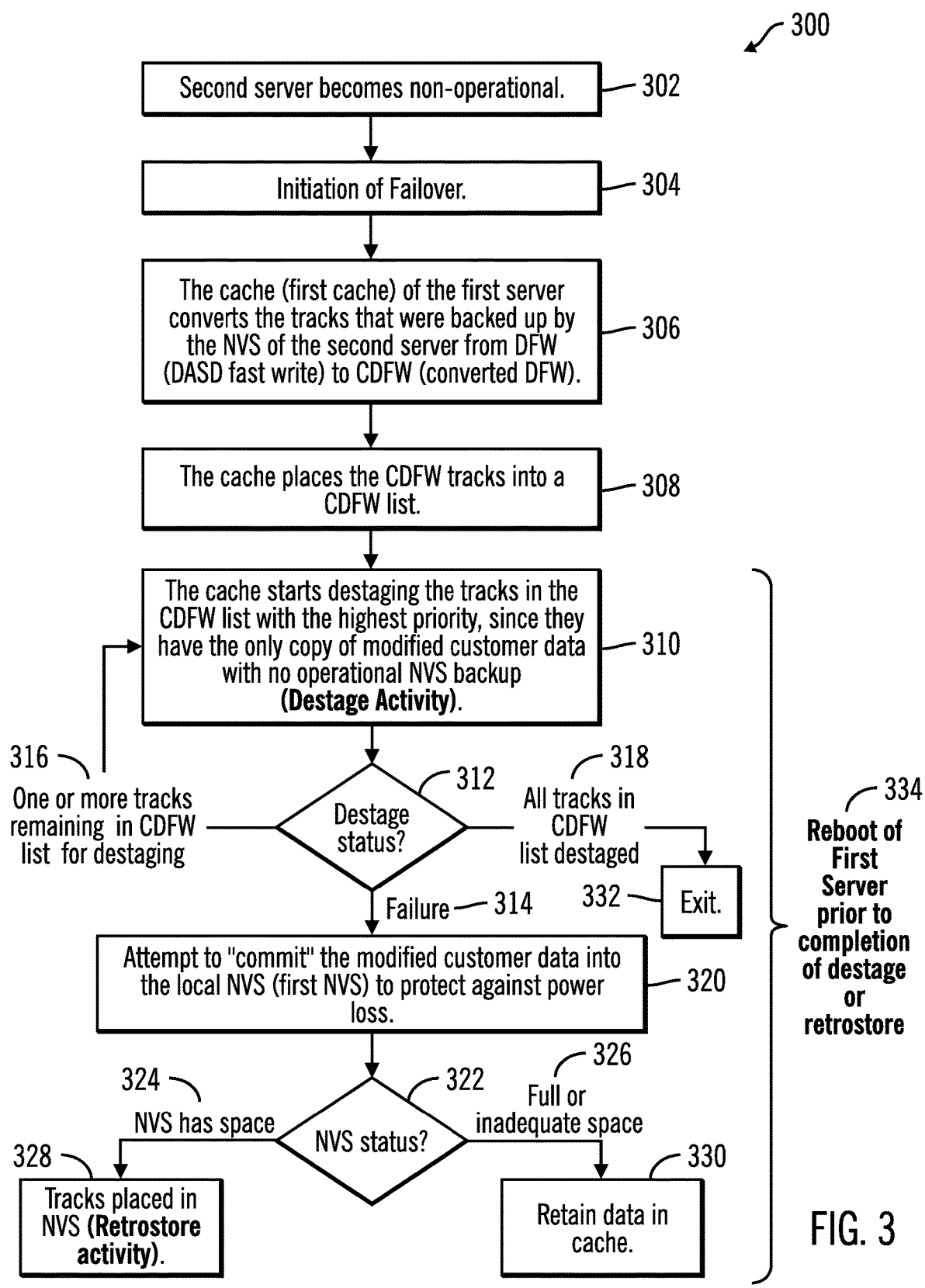
FIG. 3 illustrates a flowchart that shows reboots of a server during destage or retrostore activities, in accordance with certain embodiments.

FIG. 3 illustrates a flowchart 300 that shows reboots of a server during destage or retrostore activities, in accordance with certain embodiments.

Control starts at block 302 in which the second server 106 becomes non-operational and a failover is initiated (at block 304) to let the first server 104 take over the operations of the second server 106.

During the failover, the cache (first cache 112) of the first server 104 converts via the cache component 113 (at block 306) the tracks that were backed up by the NVS 118 of the second server 106 from DFW (DFW refers to DASD fast write, where DASD refers to direct access storage device) to CDFW (converted DFW). The cache 112 places (at block 308) the CDFW tracks into a CDFW list. Therefore, the CDFW list includes modified tracks.

Control proceeds to block 310 in which the cache 112 via the cache component 113 starts destaging the tracks in the CDFW list with the highest priority, since they have the only copy of modified customer data with no operational NVS backup. This is referred to as the "destage activity". It may be noted that the modified customer data is lost if the first server 104 undergoes a power failure.

Periodically the status of the destage activity is checked (at block 312), and there may be three cases:
(1) A failure of a destage (reference numeral 314);
(2) One or more tracks remaining in the CDFW list for destaging (reference numeral 316); and
(3) All tracks in CDFW list have been destaged (reference numeral 318).

If the destage fails for any reason, the server 104 attempts (at block 320) to "commit" the modified customer data into the local NVS 114, so that the modified customer data is protected against power loss. The NVS status is checked (at block 322) and if the NVS 114 has available space (reference numeral 324), then the track with the modified customer data is placed in the NVS 114, and the process is referred to as "retrostore". If the NVS 114 is full or has inadequate space (at block 326), then the modified customer data remains in the cache 112.

If there are one or more tracks remaining in the CDFW list (reference numeral 316) then control returns to block 310. If all tracks in the CDFW list have been destaged (reference numeral 318) then the process exits (at block 332).

In certain embodiments, there is a finite amount of time that it takes to destage or retrostore the CDFW data, and the server 104 may reboot prior to completing the destage or retrostore activity (shown via reference numeral 334).

Figure 4:
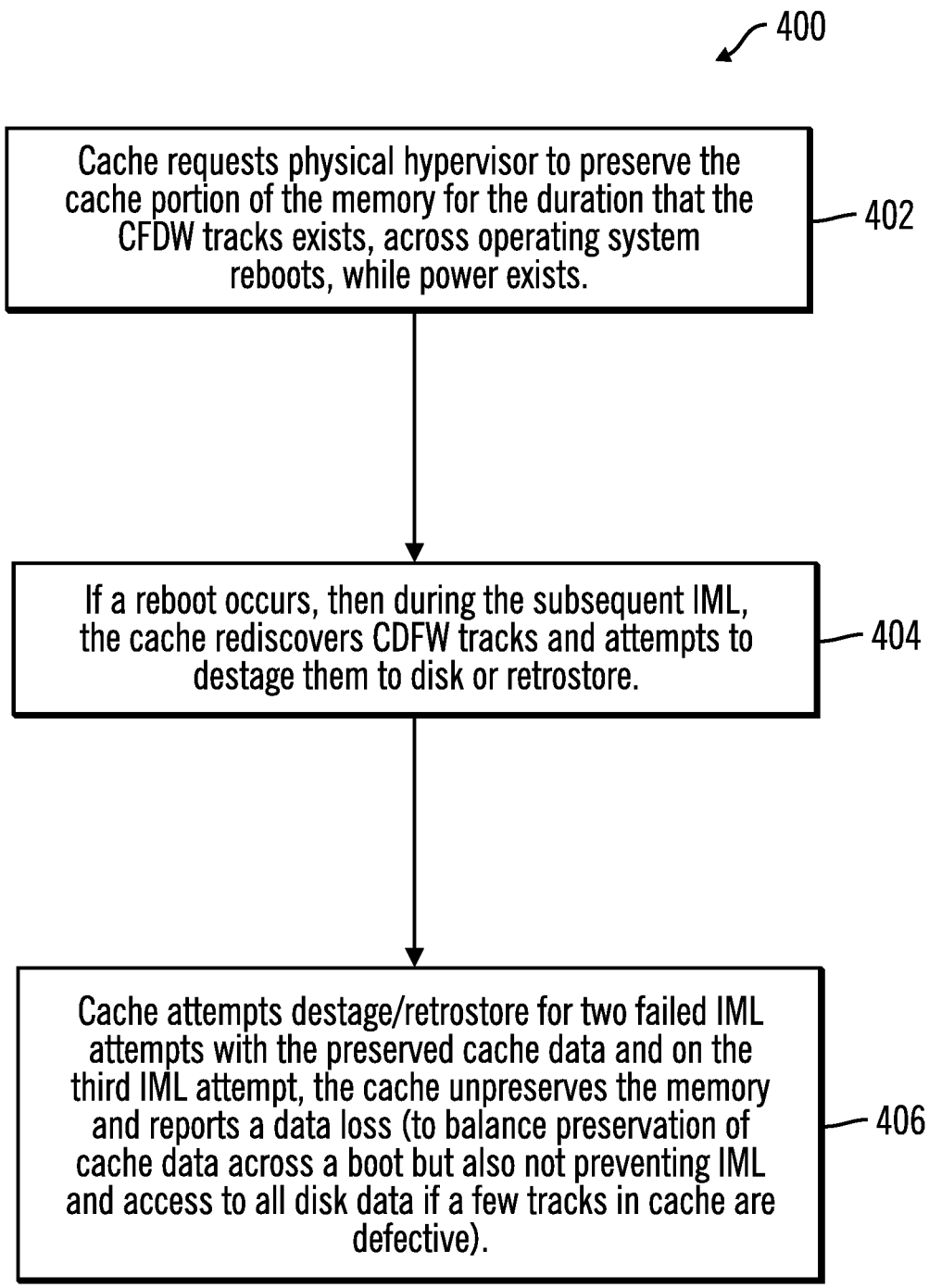
FIG. 4 illustrates a flowchart that shows the cache attempting to destage or retrostore for two failed IML attempts, in accordance with certain embodiments.

FIG. 4 illustrates a flowchart that shows the cache attempting to destage or retrostore for two failed IML, attempts, in accordance with certain embodiments.

Control starts at block 402 in which the cache 112 via the cache component 113 requests the physical hypervisor 121 to preserve the cache portion of the memory for the duration that the CFDW tracks exists, across operating system reboots, while power exists. The preservation is in the memory preserve cache. If the server 104 loses power, then the cache data is still lost.

If a reboot occurs, then during the subsequent initial microcode load (IML), the cache 112 rediscovers CDFW tracks and attempts to destage them to disk or retrostore (at block 404). The cache 112 attempts (at block 406) destage/retrostore for two failed IML attempts with the preserved cache data and on the third IML attempt, the cache 404 unpreserves the memory and reports a data loss to balance preservation of cache data across a boot but also not preventing IML and access to all disk data if a few tracks in cache are defective.

Figure 5:
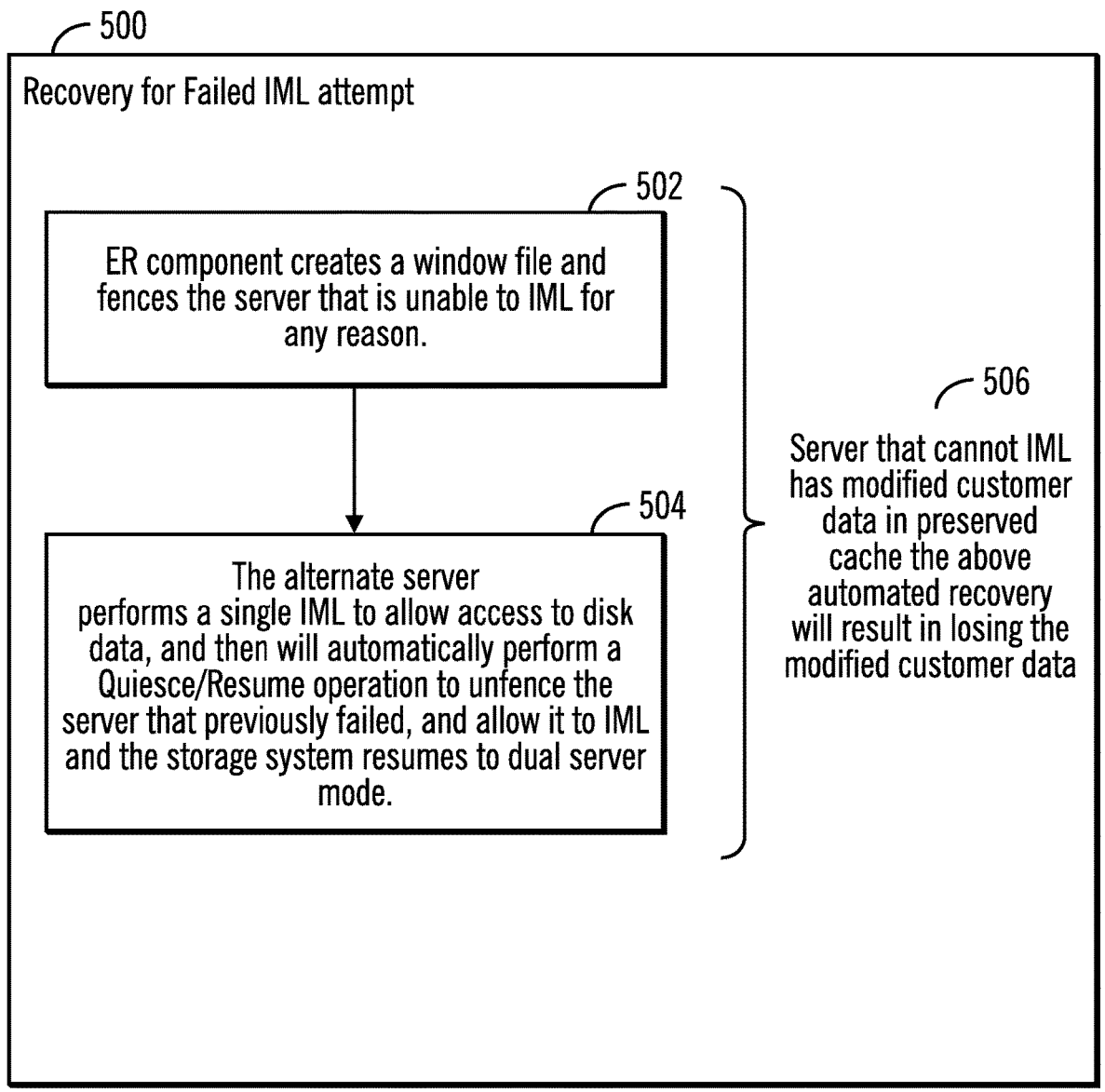
FIG. 5 illustrates a flowchart that shows recovery for failed IML attempt, in accordance with certain embodiments.

FIG. 5 illustrates a flowchart 500 that shows recovery for failed IML attempt, in accordance with certain embodiments. The recovery for failed IML attempts may be different from that shown in FIG. 4 because of modification to the error recovery (ER) component 120.

Control starts at block 502, in which the ER component 120 creates a window file that fences the server that is unable to IML for any reason. This results in the alternate server performing (at block 504) a single server IML to allow access to disk data, and then automatically performing a Quiesce/Resume operation to unfence the server that previously failed, and allow the failed server to IML and the storage system 102 then resumes to dual server mode.

The resume operation is performed by having the hardware power off and then powering on the server that could not previously IML. In a scenario where the server that cannot IML has modified CDFW customer data in preserved cache, the above automatic recovery will result in losing the modified CDFW customer data due to the hardware power off (as shown via reference numeral 506). Certain embodiments provide a mechanism to prevent losing the CDFW data.

Figure 6:
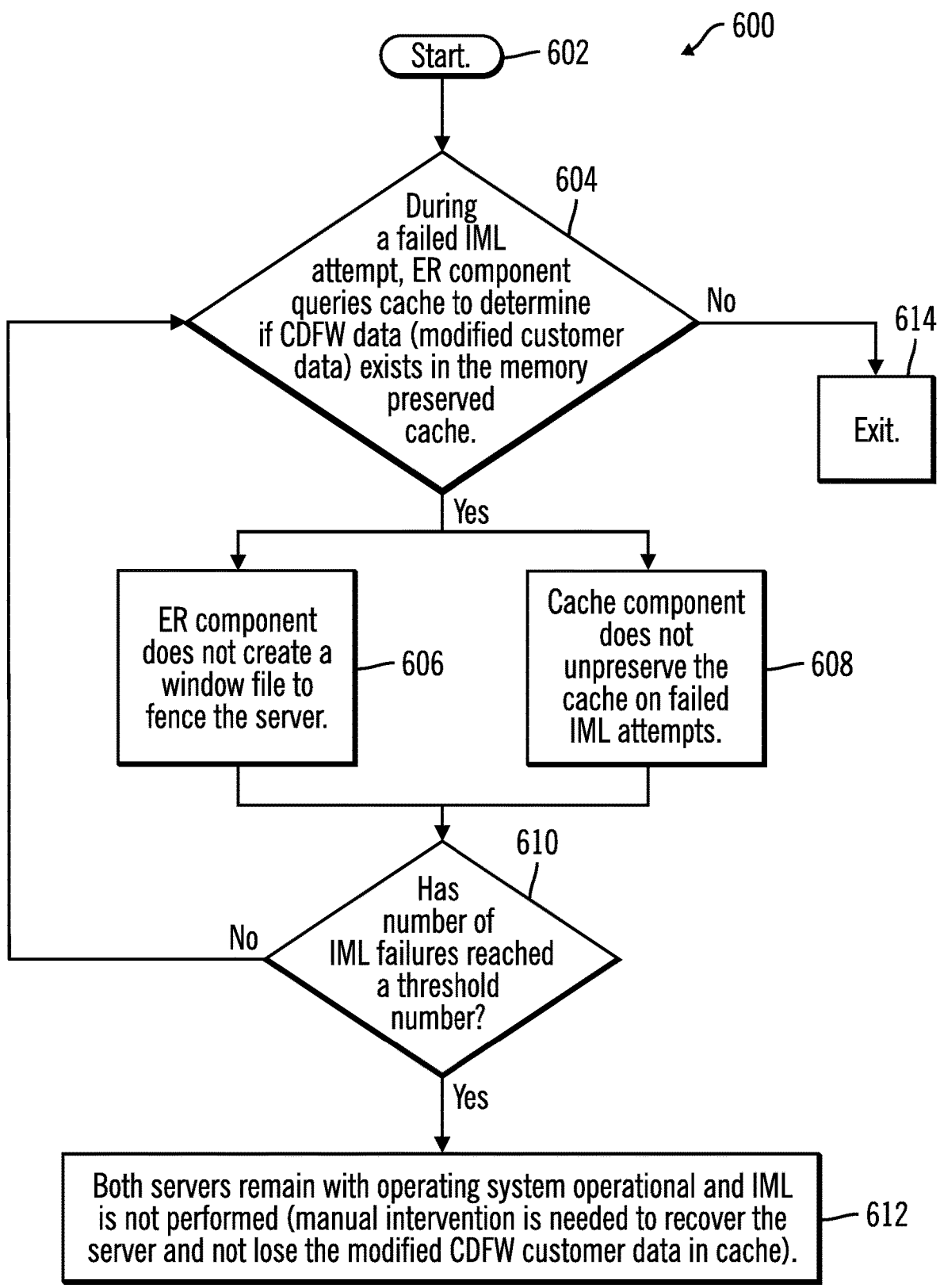
FIG. 6 illustrates a flowchart that shows operations that request manual intervention on failure of initial microcode load attempts during recovery of modified customer data, in accordance with certain embodiments.

FIG. 6 illustrates a flowchart 600 that shows operations that request manual intervention on failure of initial microcode load attempts during recovery of modified customer data, in accordance with certain embodiments.

Control starts at block 602 and proceeds to block 604 in which during a failed IML attempt, the ER component 120 queries the cache to determine if modified CDFW customer data exists in the memory preserve cache. If so, then the ER component 120 does not create a window file to fence the server (at block 606). Also, the cache component no longer unpreserves the cache on failed IML attempts (at block 608).

If IML attempts repeatedly fail (for example, if the number of IML failures reach as threshold number as shown in block 610), then the IML retry counters will reach a threshold and both servers will remain with operating system operational and no IML is performed on them. Manual intervention is then required to not lose the modified CDFW customer (at block 612).

From block 610, if the number of IML failures does not reach a threshold number control returns to block 604. Also at block 604 if modified customer data does not exist in memory preserve cache the process exits (at block 614).

Figure 7:
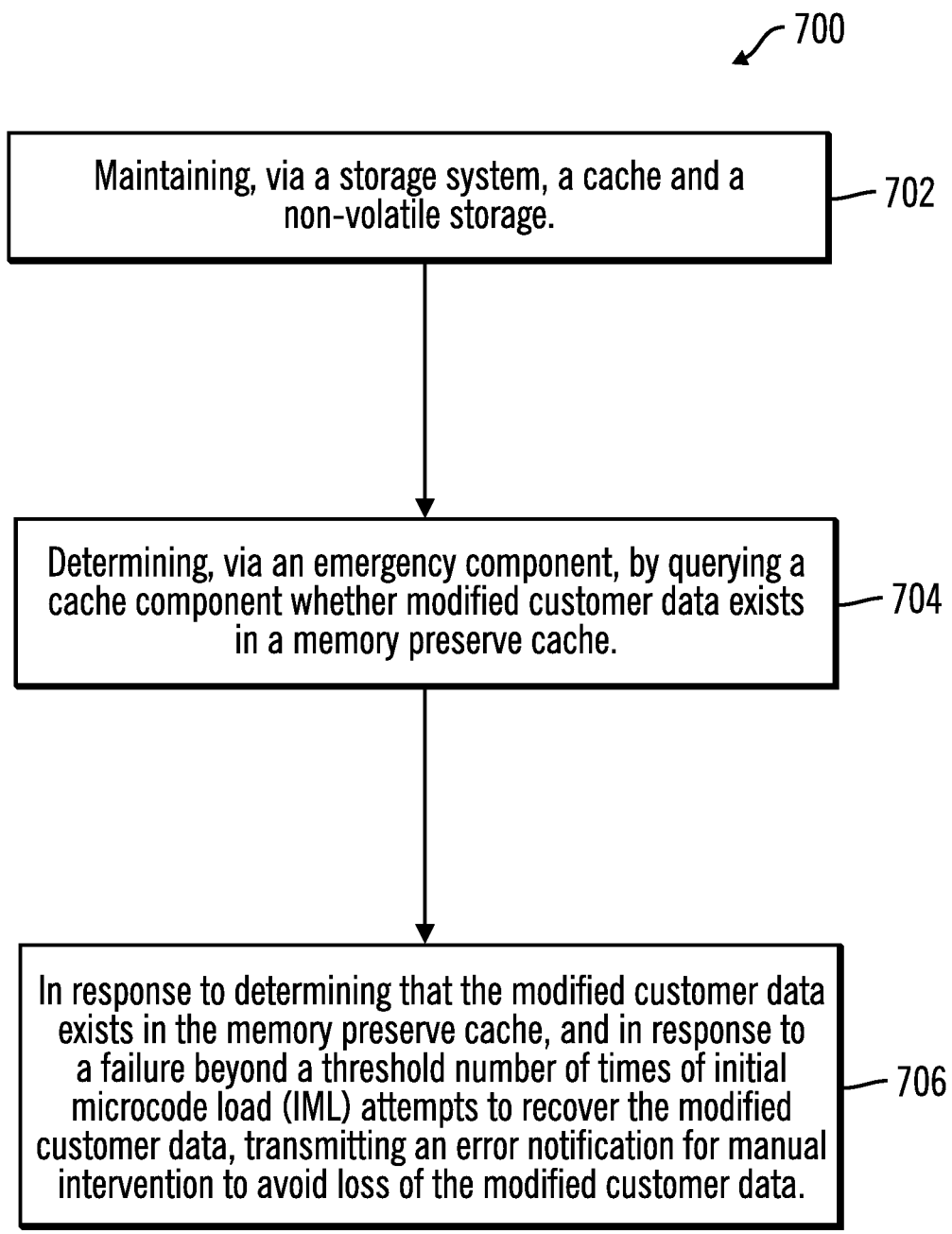
FIG. 7 illustrates a flowchart that shows additional operations that request manual intervention on failure of initial microcode load attempts during recovery of modified customer data, in accordance with certain embodiments.

FIG. 7 illustrates a flowchart that shows additional operations that request manual intervention on failure of initial microcode load attempts during recovery of modified customer data, in accordance with certain embodiments.

Control starts at block 702 in which a storage system 102 maintains a cache 112, 116 and a non-volatile storage 114, 118. An error recovery component 120 queries a cache component 113 to determine (at block 704) whether modified customer data exists in a memory preserve cache. In response to determining that the modified customer data exists in the memory preserve cache, and in response to a failure beyond a threshold number of times of initial microcode load (IML) attempts to recover the modified customer data, an error notification is transmitted (at block 706) for manual intervention to avoid loss of the modified customer data.

Therefore FIGS. 1-7 illustrate certain embodiments in which an error recovery (ER) component 120 queries a cache component to determine if modified customer data exists in a memory preserve cache. If modified customer data exists in the memory preserve cache, an error notification for manual intervention is sent to avoid loss of modified customer data in response to repeated failures of IML attempts to recover data.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
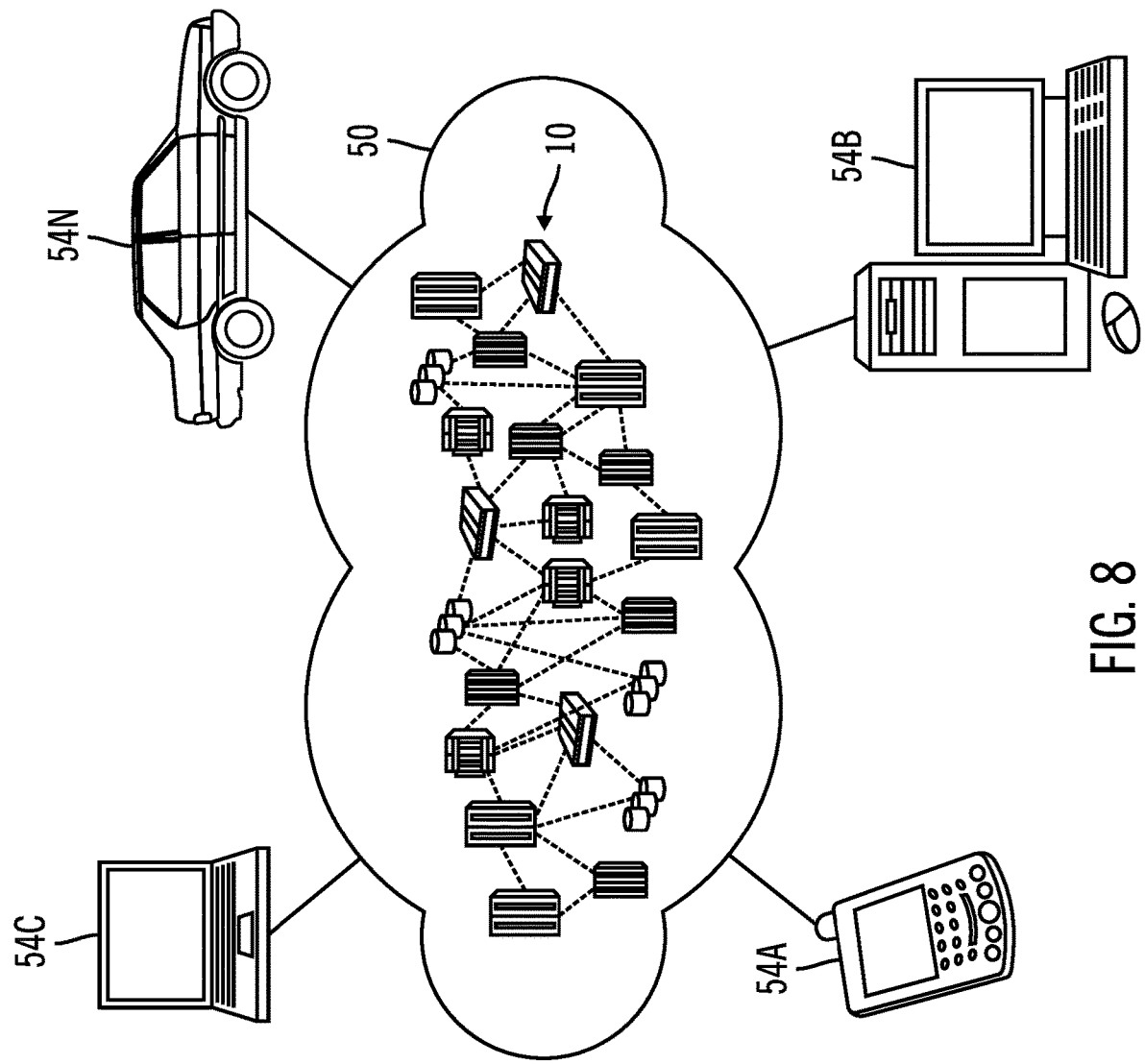
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
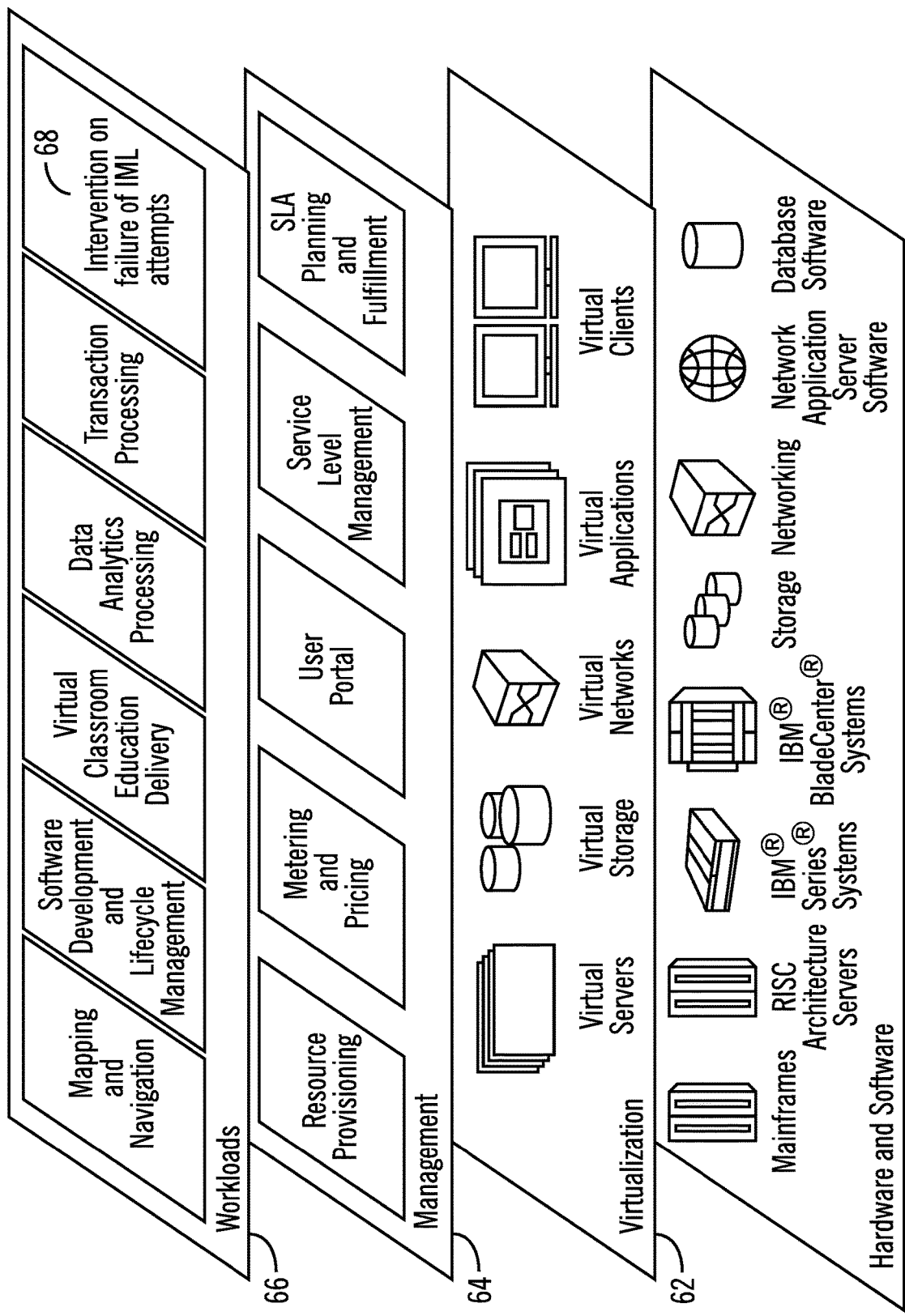
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the intervention on failure of IML attempts 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
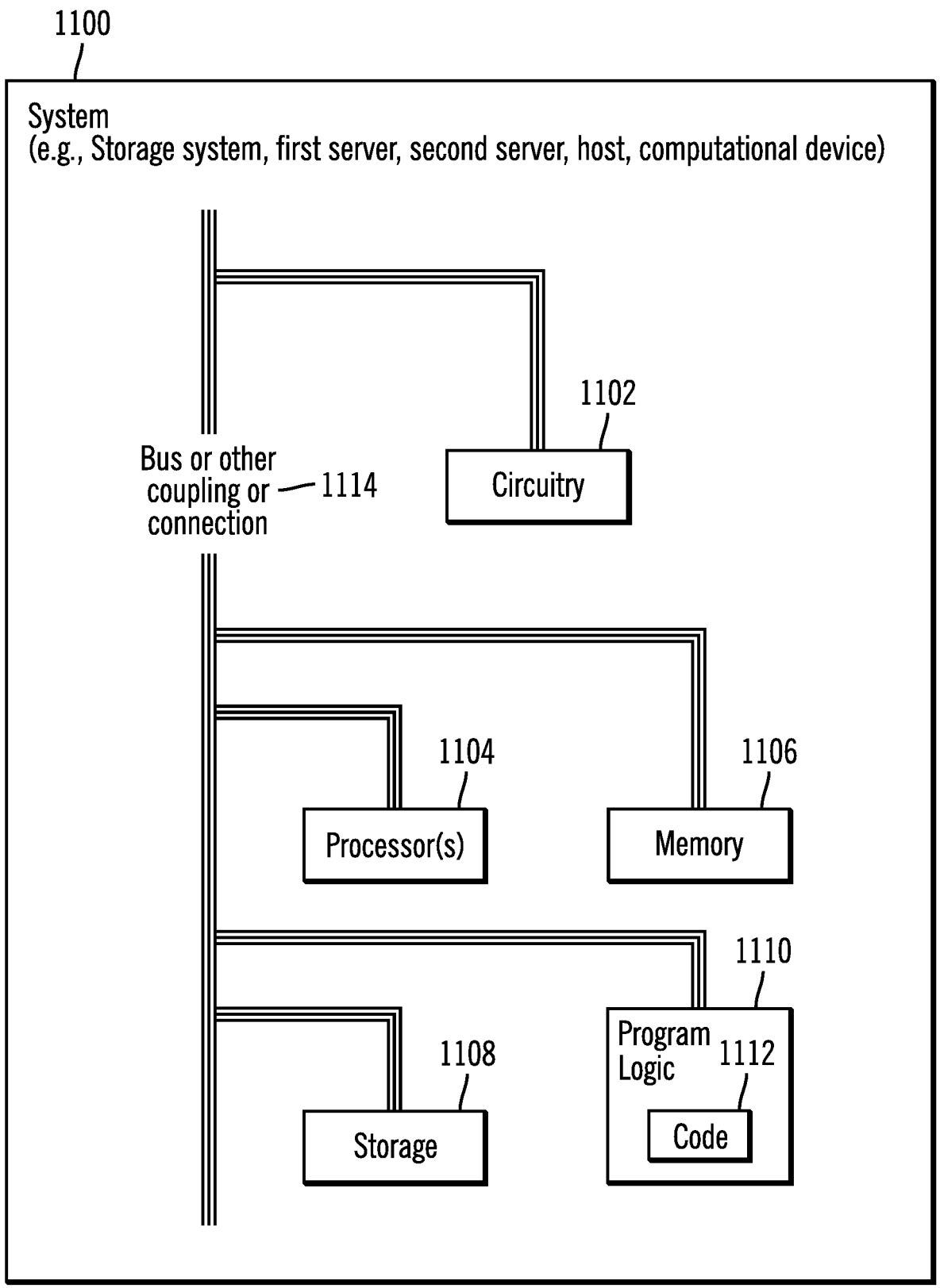
FIG. 10 illustrates a block diagram of a computational system that shows certain elements that may be included in the storage system and/or the host(s), as described in FIGS. 1-9, in accordance with certain embodiments.

FIG. 10 illustrates a block diagram that shows certain elements that may be included in the storage system 102, the first server 104, the second server 106, the hosts 108, 100 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   maintaining, via a storage system comprising a first server and a second server, a cache and a non-volatile storage;
   storing, in a direct access storage device fast write (CDFW) list, identifications of tracks that store CDFW data;
   storing, by a physical hypervisor of the storage system, in a memory preserve cache, the cache for a duration for which the identifications of the tracks that store the CDFW data exist in the CDFW list, across operating system reboot; and
   in response to determining that failures of initial microcode load (IML) attempts of the first server exceed a threshold number of failures, avoiding performing further IML attempts of the first server, and transmitting an error notification for manual intervention to avoid loss of modified CDFW data.

2. The method of claim 1, the method further comprising:
during a failed initial microcode load attempt of the first server, determining whether the CDFW data exists in the memory preserve cache.

3. The method of claim 2, wherein in response to determining that CDFW data exists in the memory preserve cache, in addition to determining whether failures of IML, attempts of the first server exceed a threshold number of failures, performing:
avoiding creating a window file to fence the first server that is unable to IML, and avoiding removing the cache from the memory preserve cache on the failed IML attempt of the first server.

4. The method of claim 2, wherein in response to determining that the CDFW data does not exist in the memory preserve cache, performing:
creating, a window file to fence the first server that has failed an IML, attempt.

5. A system, comprising:
a memory; and
a processor coupled to the memory, wherein the processor performs operations, the operations comprising:
maintaining, for a first server and a second server, a cache and a non-volatile storage;
storing, in a direct access storage device fast write (CDFW) list, identifications of tracks that store CDFW data;
storing, by a physical hypervisor of the storage method, in a memory preserve cache, the cache for a duration for which the identifications of the tracks that store the CDFW data exist in the CDFW list, across operating method reboots; and
in response to determining that failures of initial microcode load (IML) attempts of the first server exceed a threshold number of failures, avoiding performing further IML attempts of the first server, and transmitting an error notification for manual intervention to avoid loss of modified CDFW data.

6. The system of claim 5, the operations further comprising:
during a failed initial microcode load attempt of the first server, determining whether the CDFW data exists in the memory preserve cache.

7. The system of claim 6, wherein in response to determining that CDFW data exists in the memory preserve cache, in addition to determining whether failures of IML, attempts of the first server exceed a threshold number of failures, performing:
avoiding creating a window file to fence the first server that is unable to IML, and avoiding removing the cache from the memory preserve cache on the failed IML attempt of the first server.

8. The system of claim 6, wherein in response to determining that the CDFW data does not exist in the memory preserve cache, performing:
creating, a window file to fence the first server that has failed an IML, attempt.

9. A computer program product, the computer program product comprising a computer readable storage medium having computer readable program code embodied therewith, the computer readable program code configured to perform operations in a storage system comprising first server and a second server, the operations comprising:
maintaining a cache and a non-volatile storage;
storing, in a direct access storage device fast write (CDFW) list, identifications of tracks that store CDFW data;
storing, by a physical hypervisor of the storage system, in a memory preserve cache, the cache for a duration for which the identifications of the tracks that store the CDFW data exist in the CDFW list, across operating system reboots; and
in response to determining that failures of initial microcode load (IML) attempts of the first server exceed a threshold number of failures, avoiding performing further IML attempts of the first server, and transmitting an error notification for manual intervention to avoid loss of modified CDFW data.

10. The computer program product of claim 9, the operations further comprising:
during a failed initial microcode load attempt of the first server, determining whether the CDFW data exists in the memory preserve cache.

11. The computer program product of claim 10, wherein in response to determining that CDFW data exists in the memory preserve cache, in addition to determining whether failures of IML, attempts of the first server exceed a threshold number of failures, performing:
avoiding creating a window file to fence the first server that is unable to IML, and avoiding removing the cache from the memory preserve cache on the failed IML attempt of the first server.

12. The computer program product of claim 10, wherein in response to determining that the CDFW data does not exist in the memory preserve cache, performing:
creating, a window file to fence the first server that has failed an IML attempt.

* * * * *